(12) United States Patent
Harris et al.

(10) Patent No.: US 9,367,522 B2
(45) Date of Patent: Jun. 14, 2016

(54) TIME-BASED PRESENTATION EDITING

(75) Inventors: Jeff Harris, New York, NY (US); Sarah Cooper, New York, NY (US); Yiyang Joy Ding, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 375 days.

(21) Appl. No.: 13/446,785

(22) Filed: Apr. 13, 2012

(65) Prior Publication Data

US 2015/0193380 A1    Jul. 9, 2015

(51) Int. Cl.
*G06F 17/21* (2006.01)
*G06F 17/22* (2006.01)
*G06F 17/30* (2006.01)

(52) U.S. Cl.
CPC .......... *G06F 17/211* (2013.01); *G06F 17/2235* (2013.01); *G06F 17/30056* (2013.01)

(58) Field of Classification Search
CPC . G06F 17/24; G06F 17/30017; G06F 17/211; G11B 27/034; G11B 27/34
USPC ................................................ 715/201, 202
See application file for complete search history.

(56) References Cited

U.S. PATENT DOCUMENTS

| | | | |
|---|---|---|---|
| 5,142,674 A | 8/1992 | Barker et al. | |
| 5,146,552 A | 9/1992 | Cassorla et al. | |
| 5,231,577 A | 7/1993 | Koss | |
| 5,408,470 A | 4/1995 | Rothrock et al. | |
| 5,557,722 A | 9/1996 | DeRose et al. | |
| 5,708,826 A | 1/1998 | Ikeda et al. | |
| 5,799,325 A | 8/1998 | Rivette et al. | |
| 5,819,304 A | 10/1998 | Nilsen et al. | |
| 6,061,697 A | 5/2000 | Nakao | |
| 6,073,144 A | 6/2000 | van Hoff | |
| 6,349,308 B1 | 2/2002 | Whang et al. | |
| 6,349,314 B1 | 2/2002 | Patel | |
| 6,377,957 B1 | 4/2002 | Jeyaraman | |
| 6,544,294 B1 | 4/2003 | Greenfield et al. | |
| 6,766,333 B1 | 7/2004 | Wu et al. | |
| 6,904,561 B1 * | 6/2005 | Faraday et al. | ............... 715/202 |
| 6,988,241 B1 | 1/2006 | Guttman et al. | |
| 7,017,112 B2 | 3/2006 | Collie et al. | |
| 7,069,502 B2 | 6/2006 | Numata et al. | |
| 7,162,693 B2 | 1/2007 | Yamanaka et al. | |
| 7,197,510 B2 | 3/2007 | Abe et al. | |
| 7,213,199 B2 | 5/2007 | Humenansky et al. | |
| 7,263,497 B1 | 8/2007 | Wiser et al. | |
| 7,299,404 B2 | 11/2007 | Agarwal et al. | |
| 7,305,613 B2 | 12/2007 | Oezgen | |

(Continued)

OTHER PUBLICATIONS

Faithe Wempen, Microsoft PowerPoint 2010 Bible, May 24, 2010, John Wiley & Sons, p. 491-519.*

(Continued)

*Primary Examiner* — Scott Baderman
*Assistant Examiner* — Seung Jung
(74) *Attorney, Agent, or Firm* — Ropes & Gray LLP

(57) ABSTRACT

Systems and methods are disclosed herein for time-based editing of an electronic presentation. An electronic presentation editing interface for editing an electronic presentation is provided. The interface includes a digital canvas including multiple canvas objects in multiple canvas layers and a digital timeline including multiple timeline objects. Each canvas object is linked to a timeline object, and a location of a timeline object on the digital timeline is indicative of a time and a canvas layer that each linked canvas object is displayed on the digital canvas.

29 Claims, 16 Drawing Sheets

(56) References Cited

U.S. PATENT DOCUMENTS

| | | |
|---|---|---|
| 7,325,187 B2 | 1/2008 | Yashiro |
| 7,325,199 B1 | 1/2008 | Reid et al. |
| 7,350,142 B2 | 3/2008 | Kraft et al. |
| 7,437,421 B2 | 10/2008 | Bhogal et al. |
| 7,506,242 B2 | 3/2009 | Kotler et al. |
| 7,536,633 B2 | 5/2009 | Faraday et al. |
| 7,634,728 B2 | 12/2009 | Kraft |
| 7,667,862 B2 | 2/2010 | Ziegler et al. |
| 7,680,932 B2 | 3/2010 | Defaix et al. |
| 7,737,996 B2 | 6/2010 | Gerhard et al. |
| 7,761,796 B2 * | 7/2010 | Faraday et al. ............ 715/730 |
| 7,779,113 B1 | 8/2010 | Samar |
| 8,151,204 B2 | 4/2012 | Lusen et al. |
| 8,184,811 B1 | 5/2012 | Patten et al. |
| 8,266,534 B2 | 9/2012 | Curtis et al. |
| 8,332,815 B2 | 12/2012 | Balfe et al. |
| 8,392,425 B2 | 3/2013 | Matsumoto |
| 8,555,161 B2 | 10/2013 | Parker |
| 2001/0037346 A1 | 11/2001 | Johnson |
| 2002/0032701 A1 | 3/2002 | Gao et al. |
| 2002/0035580 A1 | 3/2002 | Tanabe |
| 2002/0051185 A1 | 5/2002 | Yamaguchi et al. |
| 2002/0133492 A1 | 9/2002 | Goldstein et al. |
| 2002/0161797 A1 | 10/2002 | Gallo et al. |
| 2002/0174085 A1 | 11/2002 | Nelson et al. |
| 2002/0194302 A1 | 12/2002 | Blumberg |
| 2003/0014406 A1 | 1/2003 | Faieta et al. |
| 2003/0037076 A1 | 2/2003 | Bravery et al. |
| 2003/0037303 A1 | 2/2003 | Bodlaender et al. |
| 2003/0084078 A1 | 5/2003 | Torii et al. |
| 2003/0105719 A1 | 6/2003 | Berger et al. |
| 2003/0145279 A1 | 7/2003 | Bourbakis et al. |
| 2004/0044965 A1 | 3/2004 | Toyama et al. |
| 2004/0056882 A1 * | 3/2004 | Foreman et al. ............ 345/716 |
| 2004/0085354 A1 | 5/2004 | Massand |
| 2004/0088653 A1 | 5/2004 | Bell et al. |
| 2004/0133444 A1 | 7/2004 | Defaix et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2004/0255005 A1 | 12/2004 | Spooner |
| 2005/0055337 A1 | 3/2005 | Bebo et al. |
| 2005/0091291 A1 | 4/2005 | Kaler et al. |
| 2005/0125461 A1 | 6/2005 | Filz |
| 2005/0131887 A1 | 6/2005 | Rohrabaugh et al. |
| 2005/0144256 A1 | 6/2005 | Blumberg |
| 2005/0185636 A1 | 8/2005 | Bucher |
| 2005/0200896 A1 | 9/2005 | Narusawa et al. |
| 2005/0273695 A1 | 12/2005 | Schnurr |
| 2006/0031751 A1 | 2/2006 | Ehud |
| 2006/0075332 A1 | 4/2006 | Fairweather et al. |
| 2006/0101071 A1 | 5/2006 | Henderson |
| 2006/0149831 A1 | 7/2006 | Dutta et al. |
| 2006/0200755 A1 | 9/2006 | Melmon et al. |
| 2006/0230344 A1 | 10/2006 | Jennings et al. |
| 2007/0033654 A1 | 2/2007 | Wilson |
| 2007/0061714 A1 | 3/2007 | Stuple et al. |
| 2007/0070066 A1 | 3/2007 | Bakhash |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0288637 A1 | 12/2007 | Layton et al. |
| 2008/0028302 A1 | 1/2008 | Meschkat |
| 2008/0040659 A1 | 2/2008 | Doyle |
| 2008/0059417 A1 | 3/2008 | Yamada et al. |
| 2008/0059539 A1 | 3/2008 | Chin et al. |
| 2008/0082604 A1 | 4/2008 | Mansour et al. |
| 2008/0126943 A1 | 5/2008 | Parasnis et al. |
| 2008/0127212 A1 | 5/2008 | Nakamizo et al. |
| 2008/0222273 A1 | 9/2008 | Lakshmanan et al. |
| 2009/0055755 A1 | 2/2009 | Hicks et al. |
| 2009/0089664 A1 | 4/2009 | Wagner et al. |
| 2009/0112953 A1 | 4/2009 | Barsness et al. |
| 2009/0112990 A1 | 4/2009 | Campbell et al. |
| 2009/0119572 A1 | 5/2009 | Koivunen |
| 2009/0132907 A1 | 5/2009 | Shao et al. |
| 2009/0164620 A1 | 6/2009 | Ziegler et al. |
| 2009/0307585 A1 | 12/2009 | Tranchant et al. |
| 2010/0005410 A1 | 1/2010 | Pang |
| 2010/0030578 A1 | 2/2010 | Siddique et al. |
| 2010/0050089 A1 | 2/2010 | Kim et al. |
| 2010/0070852 A1 | 3/2010 | Li |
| 2010/0083096 A1 | 4/2010 | Dupuis-Latour et al. |
| 2010/0205230 A1 | 8/2010 | Simeonov et al. |
| 2010/0205520 A1 | 8/2010 | Parish et al. |
| 2010/0218099 A1 | 8/2010 | van Melle et al. |
| 2010/0229086 A1 | 9/2010 | Howell et al. |
| 2010/0235763 A1 | 9/2010 | Massand |
| 2010/0245256 A1 | 9/2010 | Estrada et al. |
| 2010/0251122 A1 | 9/2010 | Lee et al. |
| 2010/0281076 A1 | 11/2010 | Pan et al. |
| 2010/0309436 A1 | 12/2010 | Allen, Jr. et al. |
| 2010/0318894 A1 | 12/2010 | Billharz et al. |
| 2011/0035661 A1 | 2/2011 | Balinsky et al. |
| 2011/0066957 A1 | 3/2011 | Prats et al. |
| 2011/0078246 A1 | 3/2011 | Dittmer-Roche |
| 2011/0085211 A1 | 4/2011 | King et al. |
| 2011/0099093 A1 | 4/2011 | Mills |
| 2011/0164043 A1 | 7/2011 | Arora et al. |
| 2011/0179427 A1 | 7/2011 | Krishnamoorthy et al. |
| 2011/0219331 A1 | 9/2011 | DeLuca et al. |
| 2011/0252299 A1 | 10/2011 | Lloyd et al. |
| 2011/0252335 A1 | 10/2011 | Lloyd et al. |
| 2011/0252339 A1 | 10/2011 | Lemonik et al. |
| 2011/0264712 A1 | 10/2011 | Ylonen |
| 2011/0282933 A1 | 11/2011 | Schmier |
| 2011/0296299 A1 | 12/2011 | Parker |
| 2012/0117406 A1 | 5/2012 | Eun |
| 2012/0117452 A1 | 5/2012 | Lloyd et al. |
| 2012/0131483 A1 | 5/2012 | Archer et al. |
| 2012/0166984 A1 | 6/2012 | Brunswig et al. |
| 2012/0229825 A1 | 9/2012 | Takahashi et al. |

OTHER PUBLICATIONS

"Using Adobe® Flash® Professional CS5 & CS5.5", Jan. 16, 2012, Adobe Systems Incorporated, p. 15, 19 and 125-126, http://help.adobe.com/en_US/flash/cs/using/flash_cs5_help.pdf.*

Apple Inc., Motion 5 User Manual, 2011, Apple Inc., pp. 1-1461.*

Maxim Jago et al., Creating and Editing Titles, Sep. 7, 2011, video2brain, the video located at https://www.video2brain.com/en/lessons/creating-and-editing-titles, 0-47 seconds.*

Michael, Quick Tip: How do you pause a slide in Adobe Captivate, Aug. 5, 2011, CPguru, website captured at http://www.cpguru.com/quick-tip-how-do-you-pause-a-slide-in-adobe-captivate/, p. 3.*

Ken Stone, Transitions in FCP X, Dec. 5, 2011, www.kenstone.net, captured from at http://www.kenstone.net/fcp_homepage/fcp_x_transitions_stone.html, p. 1-2.*

"Using Adobe Buzzword", 2008, pp. 1-35.

Bibi et al., "A Platform for Delivering Multimedia Presentations on Cultural Heritage," 2010 14th Panhellenic Conference on Informatics, pp. 175-179.

Brouwer et al., MathDox editor, Electronic Proceedings MathUI 2009, 2009, XP55028009, retrieved from the Internet May 23, 2012: <http://Www/>win.tue.nl/hansc/mde.pdf.

De Lara et al., "Puppeteer: Component-Based Adaptation for Mobile Computing," Proceedings of the 3rd USEIX Symposium on Internet Techonologies and Systems, 14 pages (Mar. 27, 2001).

Ellis et al., "Concurrency Control in Groupware Systems," ACM 1989, pp. 399-407.

http://web.archive.orq/web/20121021135356/http://support.mozilla.org/en_-US/kb/find-and-install-add-ons-add-features-to-firefox.

Huang et al., "A General Purpose Virtual Collaboration Room," Google 1999, pp. 1-9.

International Search Report and Written Opinion issued in PCT/US2012/028279 on Jun. 6, 2012.

John Day-Richter, Internet Archive Online Article; What's Different About the New Google Docs: Making Collaboration Fast, Sep. 9, 2010, 1-6, http:f/web.archive.org/web/20100927180700/http:J/

(56) References Cited

OTHER PUBLICATIONS googledocs.blospot. com/2010/09/whats-different-about-new-google-docs_23.html, retrieved Feb. 14, 2012.

Junuzovic et al., Read, Write and Navigation Awareness in Realistic Multi-View Collaborations, International Conference on Collaborative Computing: Networking, Applications and Worksharing, 2007, 494-503.

Kindberg, "Mushroom: A Framework for Collaboration and Interaction across the Internet," Google 1996, pp. 1-11.

Masoodian, M., et al., "RECOLED: A Group-Aware Collaborative Text Editor for Capturing Document History," In Proceedings of IADIS International Conference on WWW/Internet, Lisbon, Portugal, Oct. 19-22, 2005, International Association for Development of the Information Society, vol. 1, 323-330.

Muhammad et al., "Awareness Elembents in Web Based Cooperative Writing Applications," Second Asia-Pacific Conference on Computationa Intelligence and Industrial Applications, 18 pages (2009).

Mulvany, "What's Going on in Indexing," ACM 1997, pp. 10-15.

Munteaunu et al., "Collaborative Editing for Improved Usefulness and Usability of Transcript-Enhanced Webcasts," ACM 2008, pp. 373-382.

Nauman et al., "Apex: Extending Android Permission Model and Enforcement with User-Defined Runtime Constraints," ASIACCS '10 Apr. 13-16, 2010 Beijing, China.

Pacull et al., "Duplex: A Distributed Collaborative Editing Environment in Large Scale," ACM 1994, pp. 165-173.

http://www-archive.mozilia.org/projects/webservices, retrieved from the internet on Dec. 13, 2013.

\* cited by examiner

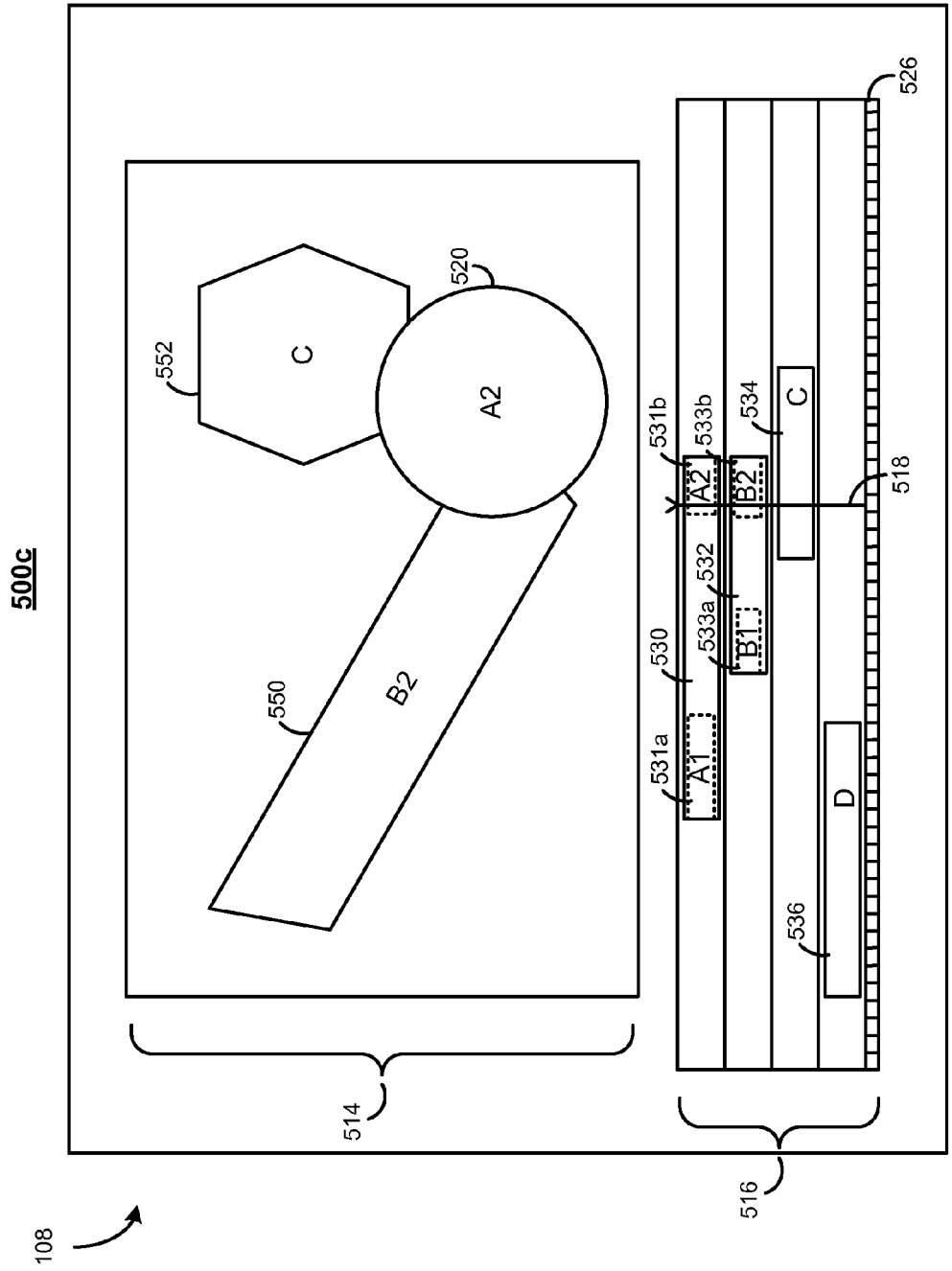

TIME-BASED PRESENTATION EDITING

FIELD OF THE INVENTION

This disclosure relates to time-based presentation document editing.

BACKGROUND

Slide-based presentation applications mix time-based concepts (such as animations and transitions) with slide-based concepts (such as objects on slides). This often leads to unnatural product limitations. For example, it is sometimes desirable to transition from one slide to a next slide while keeping an object from the first slide in the exact same place in the next slide. In slide-based presentation applications, this is done by including a copy of the object in both slides. In another example, a user may wish to include an animation in a slide. The animation may include replacing one shape with another shape in the same location. In slide-based presentation applications, this requires positioning one shape directly on top of another, making it cumbersome to select the bottom shape. Slide-based presentation applications also make it difficult to see what the presentation view looks like at a particular time midway through the slide.

SUMMARY

Accordingly, methods are disclosed herein for time-based editing of a presentation. One aspect relates to a method for providing an electronic presentation editing interface for editing an electronic presentation. The interface includes a digital canvas including multiple canvas objects in multiple canvas layers and a digital timeline including multiple timeline objects. Each canvas object is linked to a timeline object, and a location of a timeline object on the digital timeline is indicative of a time and a canvas layer that each linked canvas object is displayed on the digital canvas.

Another aspect relates to a system for providing an electronic presentation editing interface for editing an electronic presentation. The interface includes a digital canvas including multiple canvas objects in multiple canvas layers and a digital timeline including multiple timeline objects. Each canvas object is linked to a timeline object, and a location of a timeline object on the digital timeline is indicative of a time and a canvas layer that each linked canvas object is displayed on the digital canvas.

Another aspect relates to a non-transitory computer readable medium storing computer executable instructions, which, when executed by a processor, cause the processor to carry out a method for editing an electronic presentation. The method includes providing an electronic presentation editing interface, which includes a digital canvas including multiple canvas objects in multiple canvas layers and a digital timeline including multiple timeline objects. Each canvas object is linked to a timeline object, and a location of a timeline object on the digital timeline is indicative of a time and a canvas layer that each linked canvas object is displayed on the digital canvas.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIGS. 5A-5C are diagrams of exemplary displays of a presentation editing interface for time-based presentation editing, according to an illustrative embodiment.

DETAILED DESCRIPTION

To provide an overall understanding of the invention, certain illustrative embodiments will now be described, including a system for time-based presentation editing. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
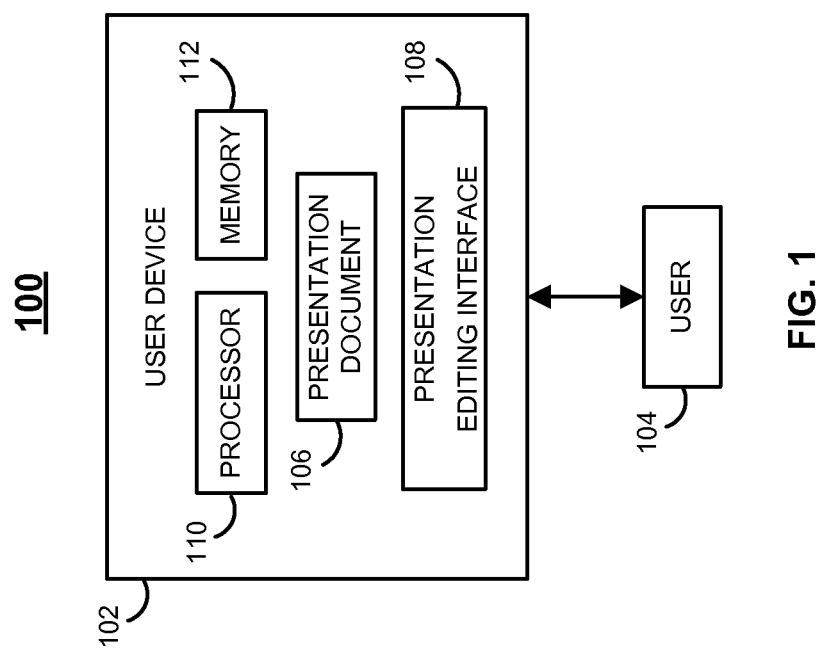
FIG. 1 is a diagram of a system for time-based presentation editing, according to an illustrative embodiment.

FIG. 1 is a diagram of a system 100 for time-based presentation editing, according to an illustrative embodiment. System 100 includes a user device 102, which includes a processor 110, a memory unit 112, a presentation document 106, and a presentation editing interface 108. A user 104 interacts with the user device 102 over the presentation editing interface 108 to edit the presentation document 106.

The user device 102 includes, without limitation, any suitable combination of one or more input devices (e.g., keypads, touch screens, trackballs, voice recognition systems, etc.) and/or one or more output devices (e.g., visual displays, speakers, tactile displays, printing devices, etc.). As used herein, "user device" includes, without limitation, any suitable combination of one or more devices configured with hardware, firmware, and software to carry out one or more of the computerized techniques described herein. Examples of user devices include, without limitation, personal computers, laptops, and mobile devices (such as smartphones, blackberries, PDAs, tablet computers, etc.).

The processor 110 refers to one or more computers, microprocessors, logic devices, servers, or other devices configured with hardware, firmware, and software to carry out one or more of the computerized techniques described herein. Processors and processing devices may also include one or more memory devices, or may use the memory unit 112 for storing inputs, outputs, and data that is currently being processed.

The memory unit 112 or a memory device in the processor 110 stores the presentation editing interface 108 and/or the presentation document 106. In addition, the memory unit further stores computer readable instructions which, when carried out by the processor 110, cause the processor to provide the presentation editing interface 108 to the user 104 such that the user 104 may use time-based presentation editing to modify the presentation document 106.

Figure 2:
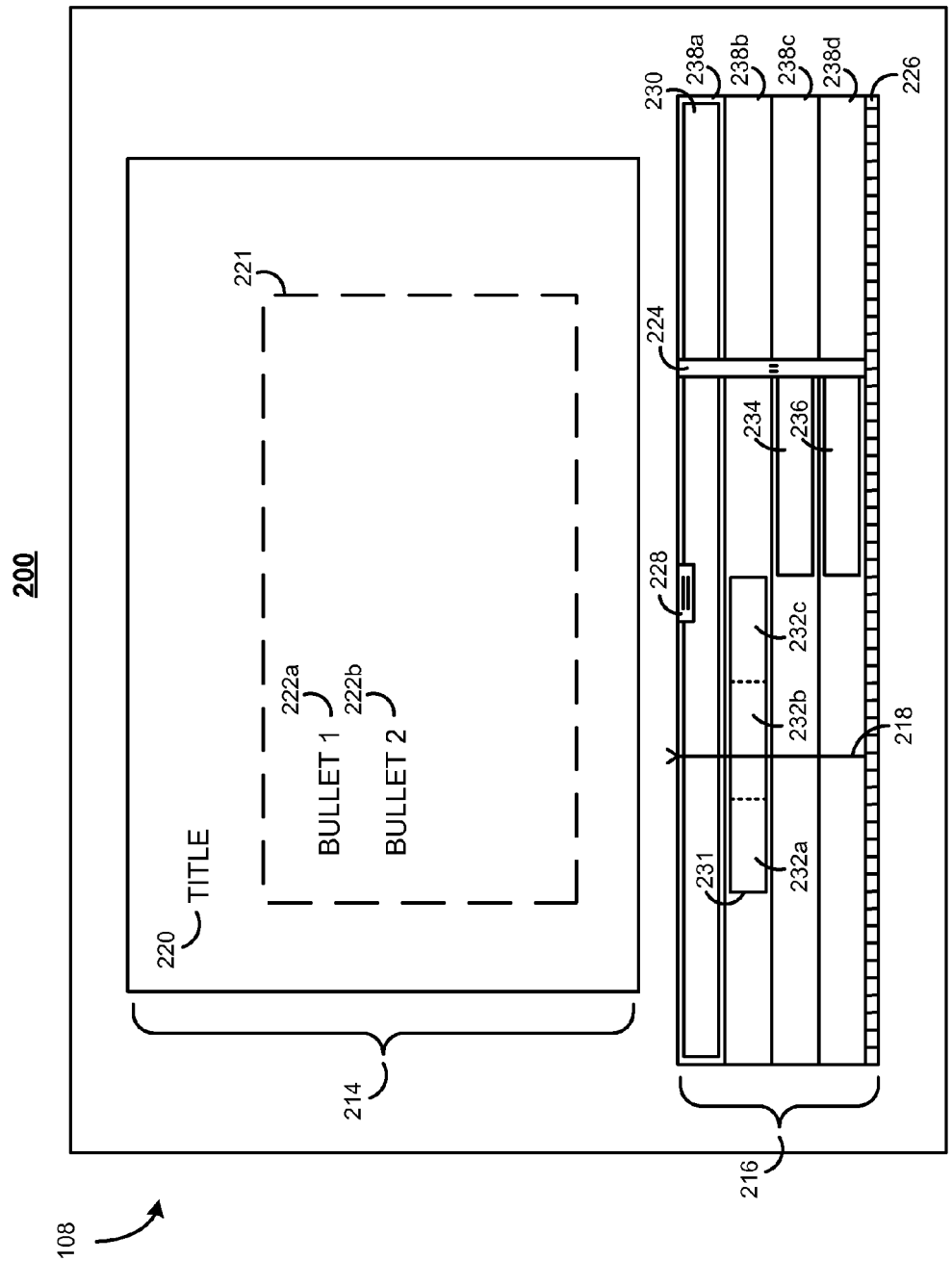
FIG. 2 is a diagram of an exemplary display of a presentation editing interface for time-based presentation editing, according to an illustrative embodiment.

FIG. 2 is a diagram 200 of an exemplary display of a presentation editing interface 108 for time-based presentation editing, according to an illustrative embodiment. Diagram 200 includes a digital canvas 214 and a digital timeline 216 corresponding to a presentation document 106. The digital canvas 214 includes several canvas objects including text boxes 220 and 221. The digital timeline 216 includes several timeline objects 230, 231, 234, and 236, a time ruler 226, and a time marker 218. Each timeline object is in one of four layers 238a-238d (collectively, layer 238), and each layer 238 corresponds to a canvas layer in the canvas 214.

The time ruler 226 represents a time axis indicative of time in a reference time period. For example, a reference time may be at the beginning of the presentation, at the time of a transition in the presentation, or any other suitable time. As shown, the time ruler 226 includes multiple equally spaced tick marks corresponding to fixed time intervals. However, the time ruler may instead include non-equidistant tick marks, may not include tick marks, or may not even be shown in the presentation editing interface 108.

The digital canvas 214 is a view of the presentation at a particular moment in time defined by the location of the time marker 218 along the time ruler 226. Each timeline object (e.g., timeline objects 230, 231, 234, and 236) in the digital timeline 216 is linked to a canvas object in the digital canvas 214 that appears at a time during the presentation. The horizontal position of each timeline object along the time ruler 226 corresponds to the time that the corresponding canvas object appears and disappears in the presentation. Thus, the width of each timeline object 230, 231, 234, and 236 in the digital timeline 216 corresponds to an amount of time (e.g., measured by the time ruler 226) that the corresponding canvas object appears in the presentation. The user 104 may adjust the location of a timeline object by providing a user input indicative of the desired location (e.g., clicking and dragging the object and/or its edges using mouse device or entering the desired location using a keyboard).

Furthermore, the layer 238 of each timeline object in the digital timeline 216 corresponds to a canvas layer in the digital canvas 214 in which the corresponding canvas object appears. For example, layers 238a-238d correspond to a front-to-back layering (corresponding to a z-axis ordering of canvas objects) in the canvas, such that canvas objects corresponding to layer 238a appear in front of those corresponding to layers 238b-238d. Alternatively, layers 238a-238d may correspond to the opposite layering order (back-to-front), or any other suitable layering order. Because the digital timeline 216 includes a layer axis representative of a front-to-back ordering of layers in the digital canvas 214, the presentation editing interface 108 allows the user 104 to conveniently select timeline objects located in low layers (i.e., back layers in the digital canvas) that may be otherwise difficult to select in a slide-based presentation application.

In the presentation editing interface 108, the view of the digital canvas 214 only includes canvas objects corresponding to timeline objects that are displayed during the presentation at the time corresponding to the time marker 218. For example, as shown, only timeline objects 230 and 231 coincide with time marker 218. In one example, the title canvas object 220 may be associated with the timeline object 230 and the canvas object 221 may be associated with the timeline object 231. At time 218, only timeline object 230 (canvas object 220) and timeline object 231 (canvas object 221), are displayed in the digital canvas 214.

As indicated by the digital timeline 216, the timeline object 230 extends over nearly the entire length of the time ruler 226, such that the canvas object 220 is displayed throughout the duration of time indicated by the time ruler 226. In one example, the digital canvas 214, the canvas object 220 is a text box including the title of the presentation (or a section title of the presentation).

The timeline object 231 includes three "timeline sub-objects" 232a-232c, separated by dashed lines. A timeline sub-object corresponds to a portion of a timeline object that may have different characteristics than a remainder of the timeline object. For example, as shown in diagram 200, timeline sub-objects 232a-232c correspond to different appear and disappear times. In particular, timeline sub-object 232a appears first, followed by timeline sub-object 232b, finally followed by timeline sub-object 232c. Bullet points 222a and 222b in the canvas object 221 correspond to timeline sub-objects 232a and 232b, respectively. The canvas object 221 further includes a third bullet point corresponding to timeline sub-object 232c, but the third bullet point is not shown in the current view because the position of timeline sub-object 232c does not coincide with the time marker 218.

Similarly, timeline objects 234 and 236 also correspond to canvas objects which are not shown in the digital canvas because timeline objects 234 and 236 also do not coincide with the time marker 218. Canvas objects may also include shapes, figures, images, graphs, data, tables, links, hyperlinks, video files, audio files, graphics, or any other object suitable for use in a presentation, or a combination thereof.

The user 104 may change the location of the time marker 218 to change the current view of the digital canvas 214. For example, the user 104 may select the time marker 218 (e.g., by clicking with an input device such as a mouse) and select a new location (e.g., by dragging the time marker 218 to a different location on the time ruler 226). In addition, the presentation editing interface 108 may include play, pause, stop, and/or fast forward buttons. These buttons may also be used by the user 104 to navigate the presentation. When a new location is selected, the digital canvas 214 would then include canvas objects corresponding to timeline objects that coincide with the new location. Thus, the presentation editing interface 108 allows the user to view (and edit) the presentation at an arbitrary point in the presentation time and does not limit the user to work with slides as in conventional slide-based presentation applications.

The pause bar 224 in the timeline 216 indicates a pause in the presentation. This means that when the presentation reaches the time corresponding to the location of the pause bar 224, the presentation pauses until an input from the user (e.g., the presenter) is received such as a click from a mouse or a press of a button. When the user input is received, the presentation advances.

When the user 104 selects the pull-down tab 228, the timeline 216 decreases substantially in size or is partially or completely hidden, allowing for a larger display of the digital canvas 214 for more convenient canvas editing. This feature allows for the user to more accurately place canvas objects at desired locations in the digital canvas 214 or make any other suitable adjustments to the presentation. Other tabs, buttons, or options may also include the same functionality as the pull-down tab 228.

In diagram 200, the digital canvas 214 is displayed above the digital timeline 216. However, the digital timeline may also be placed at any other suitable placement in the presentation editing interface 108 relative to the digital canvas 214. For example, the time ruler 226 is shown as a horizontal axis, but the time ruler 226 may be vertical or any other suitable axis.

In some embodiments, each of timeline objects 230, 231, 234, and 236 are displayed as a smaller version of the corresponding canvas object, an abbreviated version, a user-set label or icon, any other suitable way of denoting a canvas object, or a combination thereof. The user 104 may customize the view of the timeline objects by selecting one or more of these options. Timeline objects may also be color-coded according to the object type of the corresponding canvas object.

Figure 3A:
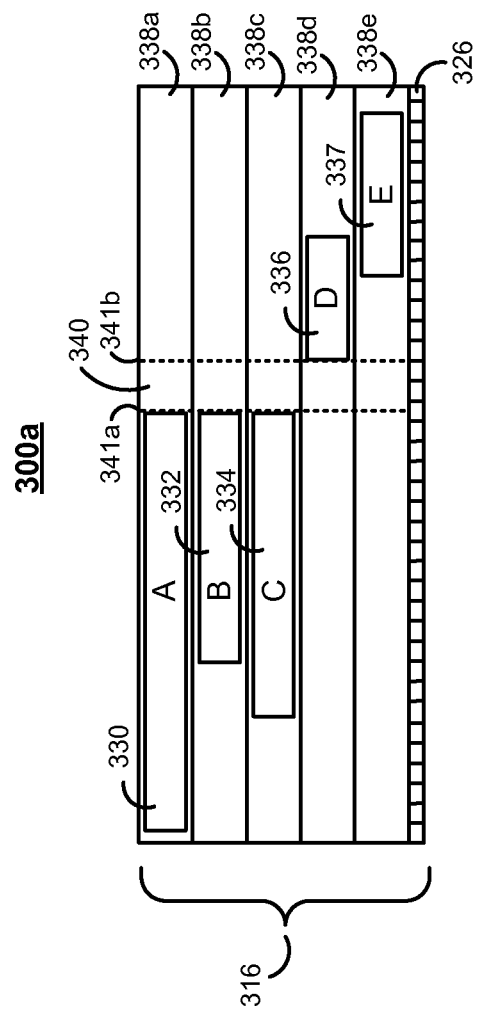
FIGS. 3A and 3B are diagrams of exemplary timelines in a presentation editing interface, according to an illustrative embodiment.
Figure 3B:
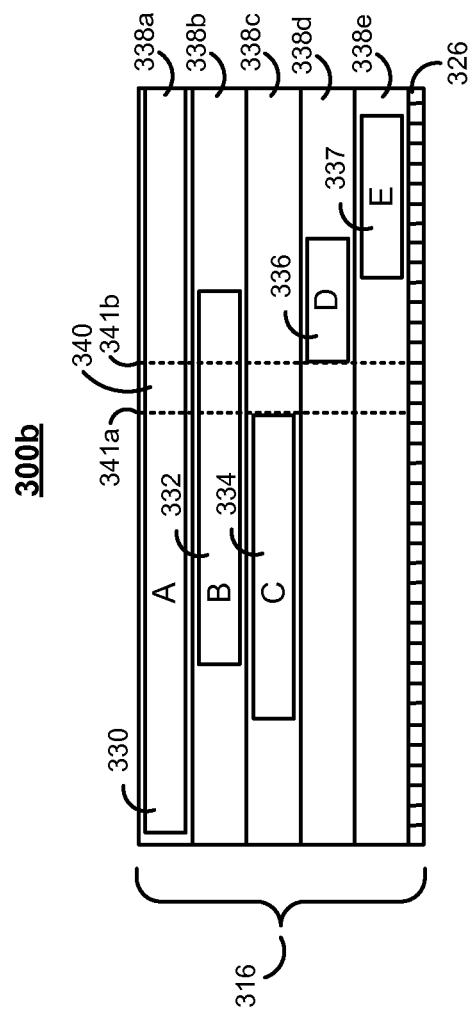

FIGS. 3A and 3B are diagrams 300a and 300b, respectively, of example digital timelines 216 in a presentation editing interface 108, according to an illustrative embodiment. In diagram 300a, various timeline objects 330-337 are contained in five layers 338a-338e. In addition, a transition region 340 is flanked on two sides by transition edges 341a and 341b. The transition region 340 in the digital timeline 316 corresponds to a time during which the presentation transitions from one set of objects to another set of objects. For example, in diagram 300a, the transition region 340 indicates a transition between the set of timeline objects 330-334 and the timeline object 336. This means that during the transition, the set of timeline objects 330-334 disappears and the timeline object 336 appears. The user 104 may adjust the width and position of the transition region by changing the locations of the transition edges 341a and 341b (e.g., by clicking and dragging). Alternatively, the width and position of the transition region may be set by inputting the appropriate data (e.g., over a user input device such as a keyboard).

The timeline objects 330-337 may be tied (or "locked") to the transition region 340, such that the widths of the timeline objects 330-337 may also change when the transition region changes. For example, if the transition edge 341a is moved to the left (i.e., to an earlier time), the right edges of timeline objects 330-334 may also shift to the left by the same amount, effectively shortening the widths of these timeline objects. A "lock edges" option may be selected such that transition edges 341 are tied to edges of timeline objects if one edge is placed within a threshold proximity to another edge. The edges may later be "unlocked" by providing input (by right-clicking on the edges and selecting an unlock option, for example).

The transition region 340 may further be configured to include one or more transition effects such as fading, blinds, box, checkerboard, comb, or any other suitable transition effect for a presentation. The speed of the transition effect is set by the width of the transition region 340.

Diagram 300b is identical to diagram 300a, except that the widths of timeline objects 330 and 332 extend through the transition region 340. Any transition effect corresponding to the transition region 340 occurs between timeline objects 334 and 336, and timeline objects 330 and 332 are unaffected by the transition region 340. In this case, the timeline objects are not tied to the transition region 340 such that if the transition edges are moved, the edges of the timeline objects 330 and 332 do not change.

Figure 4:
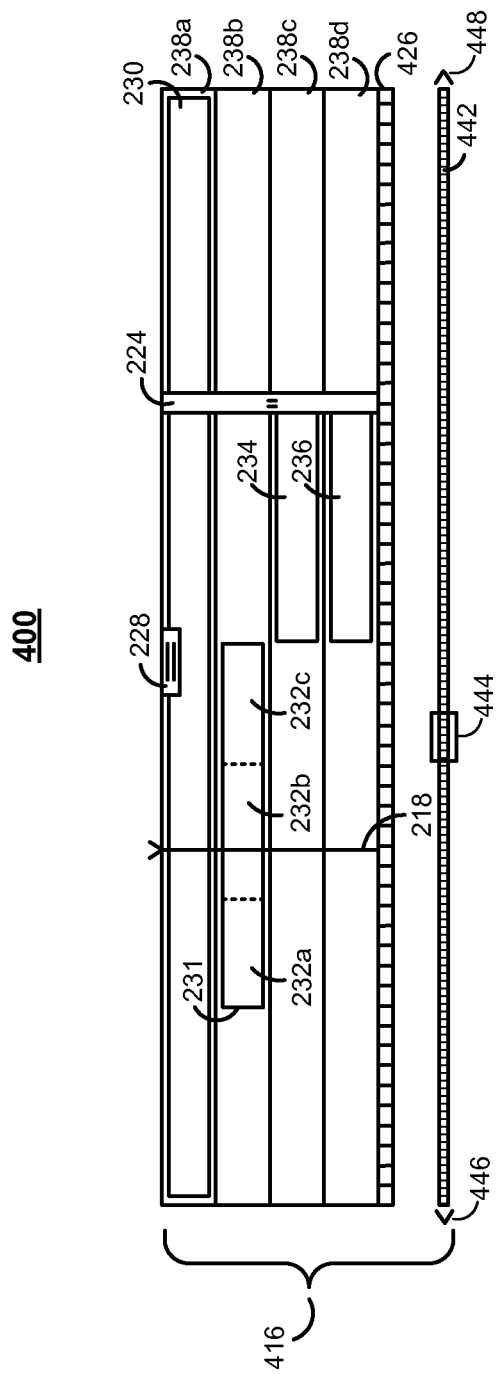
FIG. 4 is a diagram of an exemplary display of a collapsed digital timeline in a presentation editing interface, according to an illustrative embodiment.

FIG. 4 is a diagram 400 of an example focused digital timeline 416 in a presentation editing interface 108, according to an illustrative embodiment. The focused digital timeline 416 is identical to the digital timeline 216 in diagram 200 except that diagram 400 shows a focused view of the entire presentation timeline. In the focused view, the focused time ruler 426 replaces time ruler 226, and diagram 400 includes a presentation time ruler 442. A focus may occur in the horizontal axis (time), in the vertical axis (layer), or both. For long presentations with many layers, it is undesirable to view the presentation timeline over the presentation's entire length in a single display because it may be difficult to select timeline objects or other timeline features for editing. Features such as presentation time ruler 442 and box 444 allow for convenient editing of such complex presentations.

In particular, the presentation time ruler 442 represents a time axis indicative of an amount of time since a reference time (i.e., the beginning of the presentation). The presentation time ruler 442 extends over a longer length of the presentation than extended by the focused time ruler 426. For example, the presentation time ruler 442 may extend over the entire length of the presentation such that the left edge of the presentation time ruler 442 corresponds to the beginning of the presentation and the right edge corresponds to the end of the presentation. Alternatively, the presentation time ruler 442 may not extend over the entire length of the presentation. In this case, the user 104 may select (e.g., by clicking or hovering with a mouse or using keyboard input) arrows 446 or 448 to scroll the presentation time ruler 442 to the left or right, respectively.

The left and right edges of box 444 on the presentation time ruler 442 correspond to the same times represented by the left and right edges of the focused time ruler 426. The user 104 may adjust the width and position of the focused time ruler 426 by adjusting the width and position of the box 444 (i.e., by clicking and dragging the box 444 and/or its edges) on the presentation time ruler 442.

In addition, some presentations have many layers, and it may be undesirable to view layers that do not contain objects at times within the left and right edges of the focused time ruler 426. Thus, the digital timeline 416 may be focused (or collapsed) in the layer axis as well, such that those layers that do not contain objects within a defined time window do not appear (or are substantially smaller in size than other layers).

Figure 5A:
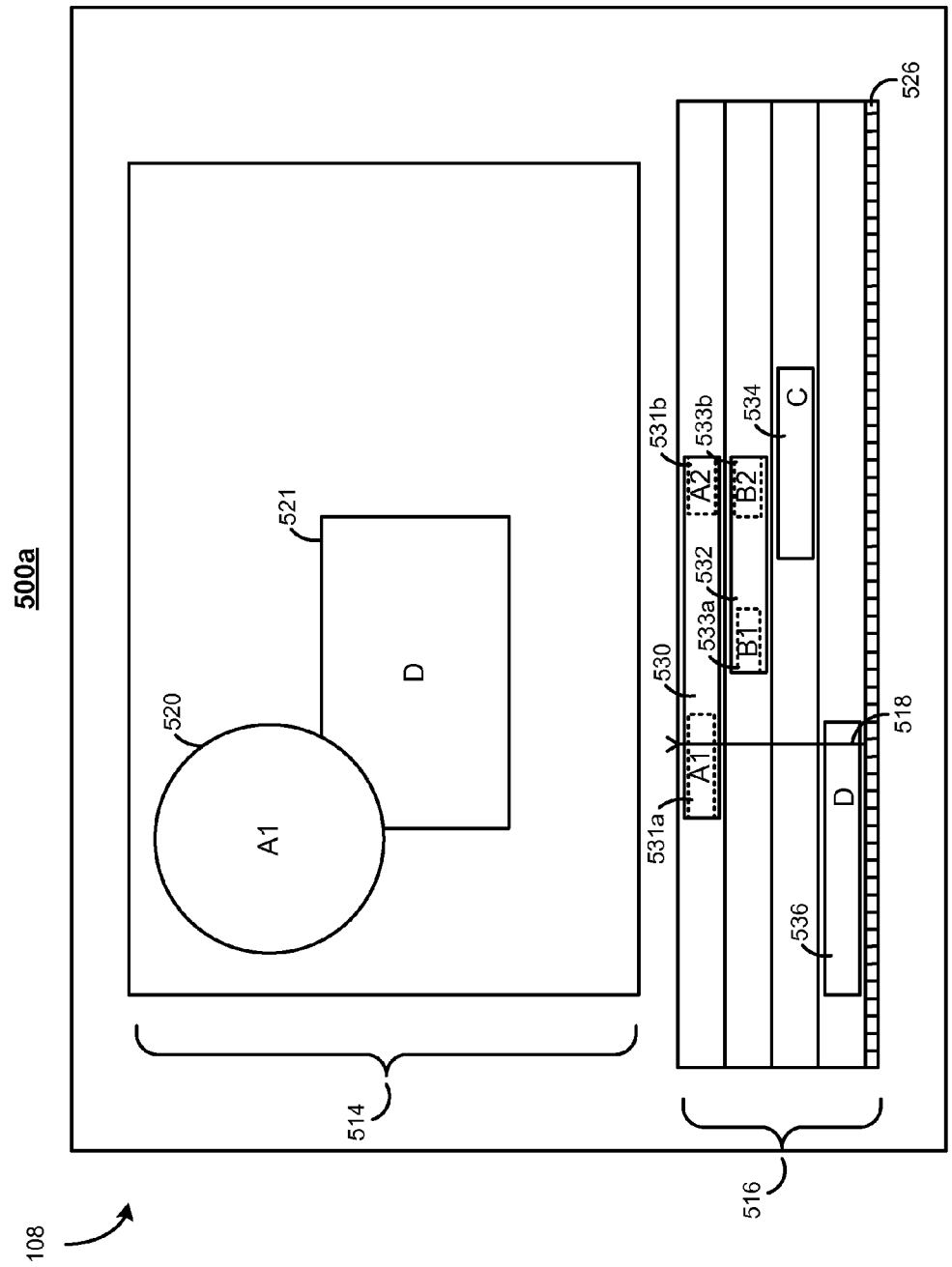
Figure 5B:
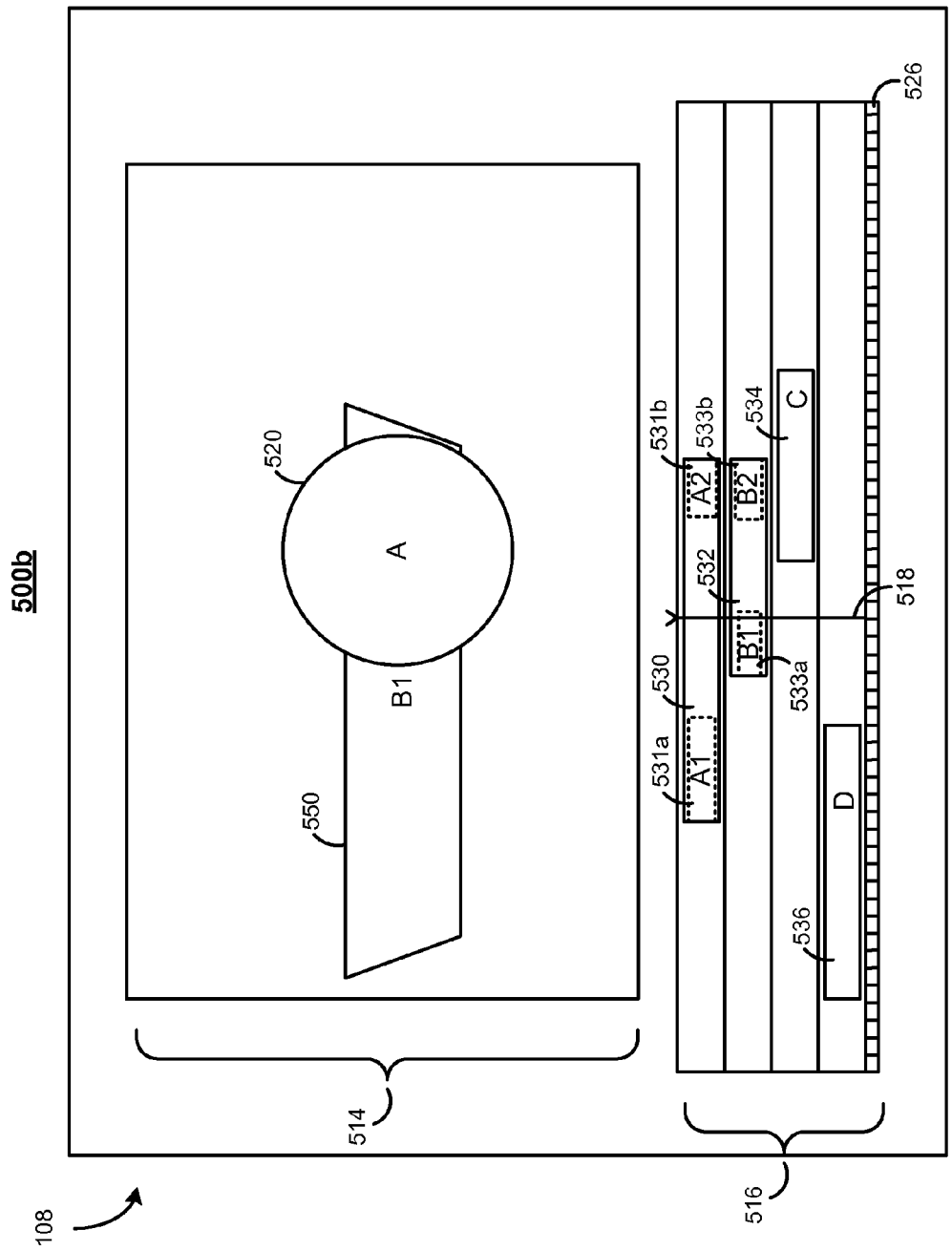

FIGS. 5A-5C are diagrams 500a-500c of exemplary displays of a presentation editing interface 108 for time-based presentation editing, according to an illustrative embodiment. Diagrams 500a-500c correspond to sequential views of the presentation editing interface for different positions of the time marker 518. In particular, diagram 500a corresponds to an earlier view than diagram 500b, which corresponds to an earlier view than diagram 500c.

In diagram 500a, the canvas objects 520 and 521 correspond to the timeline objects 530 and 536, respectively. Each timeline object has at least one state, where a state includes information related to the corresponding canvas object such as the position, size, angle, orientation, color, layer, or any other suitable information related to an object in a presentation. Timeline objects 534 and 536 each have a single state, and timeline objects 530 and 532 each include two states: states 531a (A1) and 531b (A2) for timeline object 530 and states 533a (B1) and 533b (B2) for timeline object 532. Two states corresponding to the same timeline object may have different characteristics regarding any of the information related to an object in a presentation. The position and width of each state correspond to the time the corresponding canvas object remains in the defined state. As shown in the digital canvas, the state 531a of the timeline object 530 indicates that the canvas object 520 is a circle shape at the top left of the digital canvas 514.

In diagram 500b, the canvas object 521 corresponding to timeline object 536 is no longer visible in the digital canvas because the timeline object 536 is no longer aligned with time marker 518. Instead, the canvas object 550 corresponding to timeline object 532 is visible and has a first state 533a (B1). Further, the time marker 518 is in between states 531a and 531b, such that the digital canvas 514 displays canvas object 520 transitioning between the two states. The state 531b of the timeline object 530 has the same characteristics as the state 531a, except that state 531b indicates that the canvas object 520 will be placed at the bottom right of the digital canvas 514, rather than the top left. Thus, at the time corresponding to the time marker 518, canvas object 520 is transitioning from state 531a (top left position) to state 531b (bottom right position).

In diagram 500c, the canvas object 520 is in the bottom right position defined by state 531b of timeline object 530. In addition, the canvas object 550 has a different angle corresponding to state 533b, and the canvas object 552 has appeared in the digital canvas 514.

The user 104 may set the speed of transition between states for a timeline object by adjusting the edge locations of the states 531a-531b and 533a-533b. For example, the width of the state 531a indicates the time for which the canvas object 520 remains in that state before beginning to transition into the state 531b. The transition is complete when the state 531b is reached. Thus, the speed of transition is determined by locations of the right edge of state 531a and the left edge of state 531b. The speed of transition for timeline object 532 may be similarly set by adjusting the edges of states 533a and 533b.

The user 104 may also set other characteristics of the transition between states. Example transition characteristics include effects similar to those described in relation to FIGS. 3A and 3B, such as fading, blinds, box, checkerboard, comb, or any other suitable transition effect for an object in a presentation. When a canvas object such as canvas object 520 changes positions between states, it may be desirable for a smooth transition to be configured, such that the canvas object 520 moves smoothly from the top left corner to the bottom right corner, as suggested by FIG. 5B.

For ease of illustration, the canvas objects shown in diagrams 500a-500c are simple shapes with simple states, but it will be understood that canvas objects are not limited to shapes and may include text, figures, images, or any other suitable object in a presentation, and that states may involve more complex data such as size, color, layer, any other suitable data related to an object, or a combination thereof. In addition, as shown the timeline objects 530 and 532 each have two states. However, any number of states may be included in a timeline object.

Figure 6A:
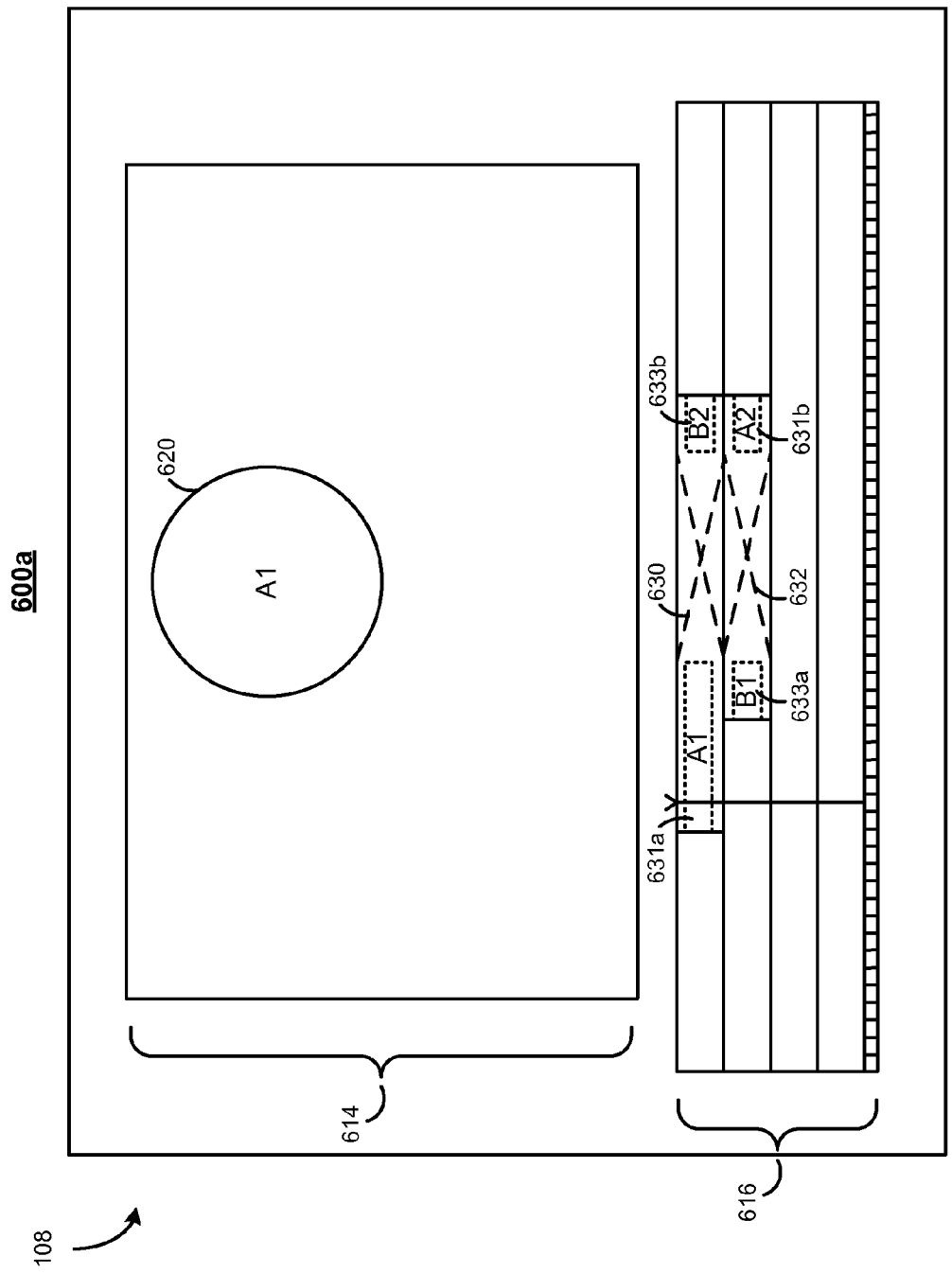
FIGS. 6A-6C are diagrams of exemplary displays of a presentation editing interface for time-based presentation editing, in which objects switch layers during an animation, according to an illustrative embodiment.
Figure 6B:
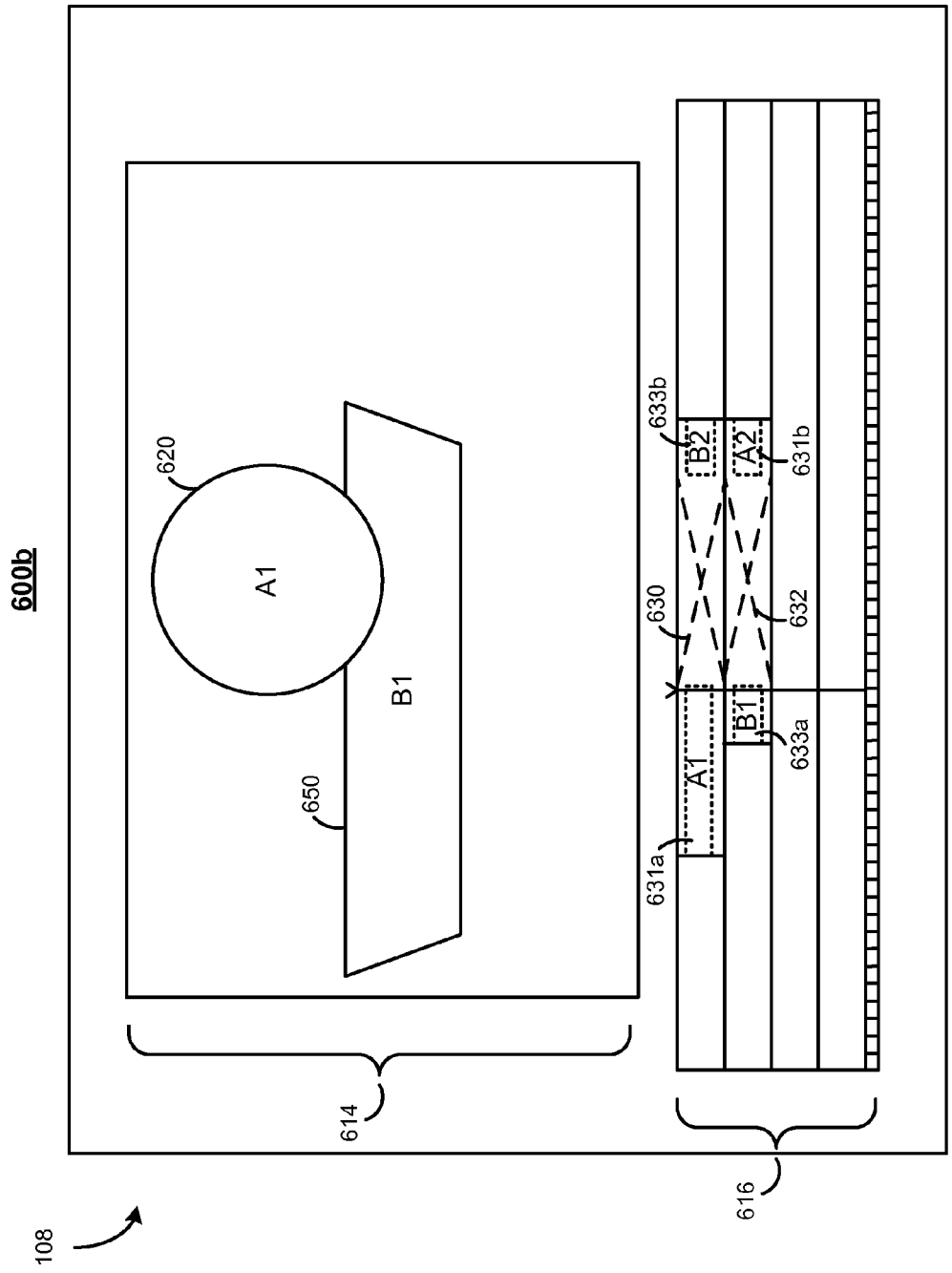
Figure 6C:
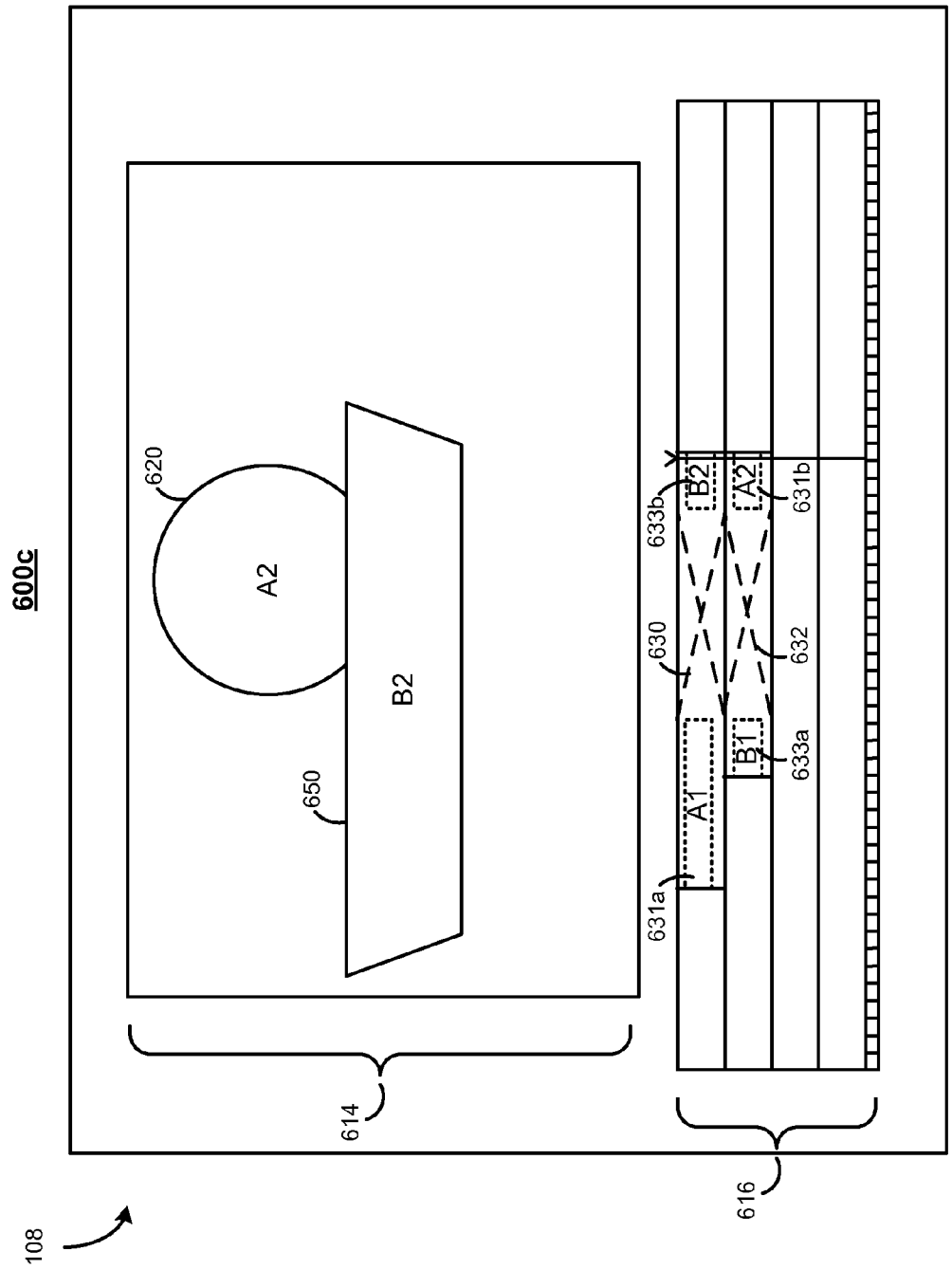

FIGS. 6A-6C are diagrams of exemplary displays of a presentation editing interface 108 for time-based presentation editing, in which objects switch layers during a state transition, according to an illustrative embodiment. In diagram 600a, the canvas object 620 has a state 631a, which indicates that the canvas object 620 is in a top layer of the digital canvas. In diagram 600b, the canvas object 650 in the state 633a is included in the digital canvas 614. Because the timeline object 632 (corresponding to the canvas object 650) is in a lower layer than the timeline object 630 (corresponding to the canvas object 620), the canvas object 650 is displayed behind the canvas object 620 in the digital canvas. In diagram 600c, this relationship is inverted such that the canvas object 620 is behind the canvas object 650.

Figure 7A:
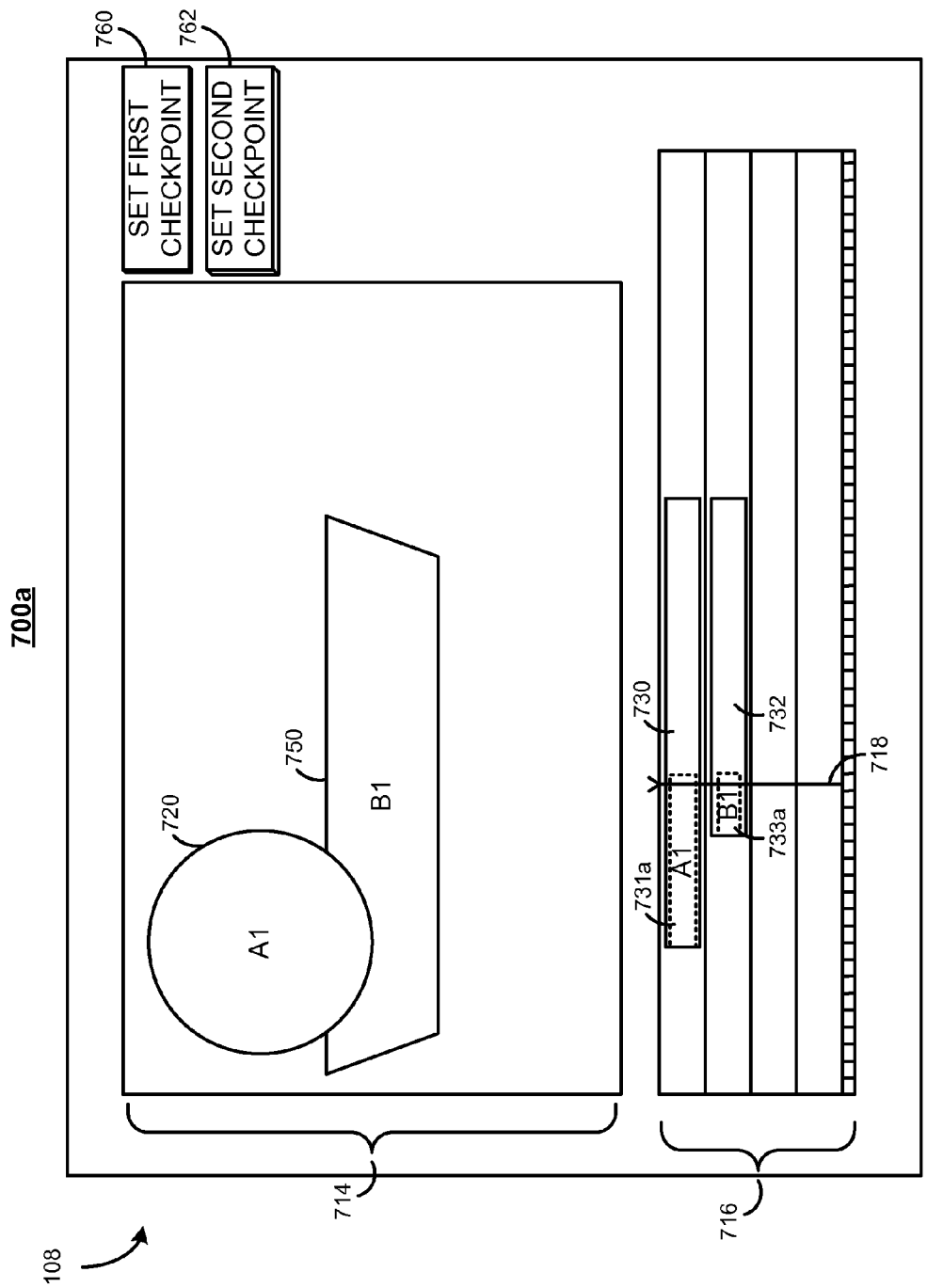
FIGS. 7A and 7B are diagrams of exemplary displays of a presentation editing interface for time-based presentation editing, in which an animation is configured, according to an illustrative embodiment.
Figure 7B:
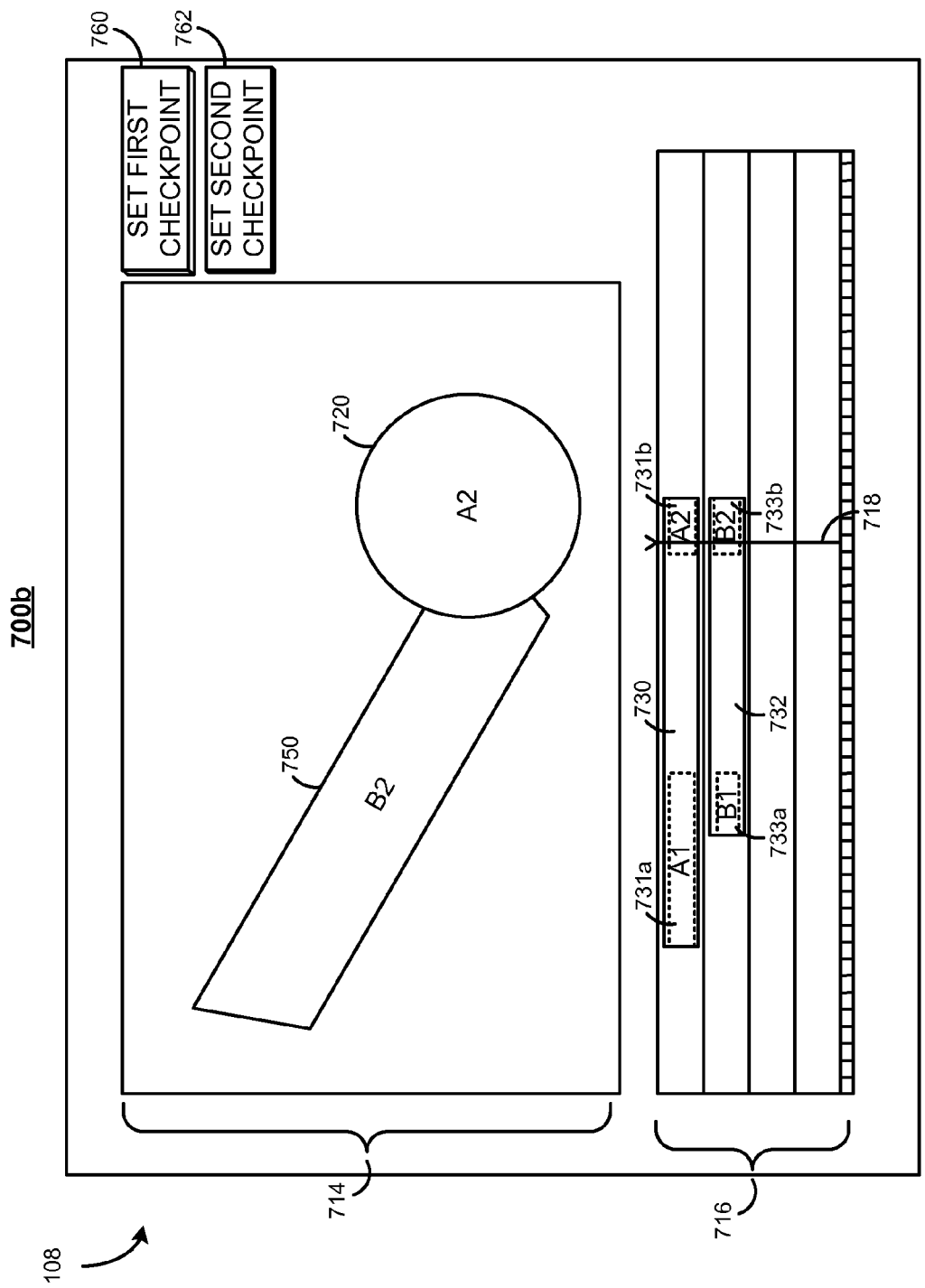

FIGS. 7A and 7B are diagrams 700a and 700b of exemplary displays of a presentation editing interface for time-based presentation editing, in which an animation is configured, according to an illustrative embodiment. Diagrams 700a and 700b each include a digital canvas 714 and a digital timeline 716. In addition, diagrams 700a and 700b also include two buttons 760 and 762. The function of these buttons is explained in detail below with reference to FIG. 8.

Figure 8:
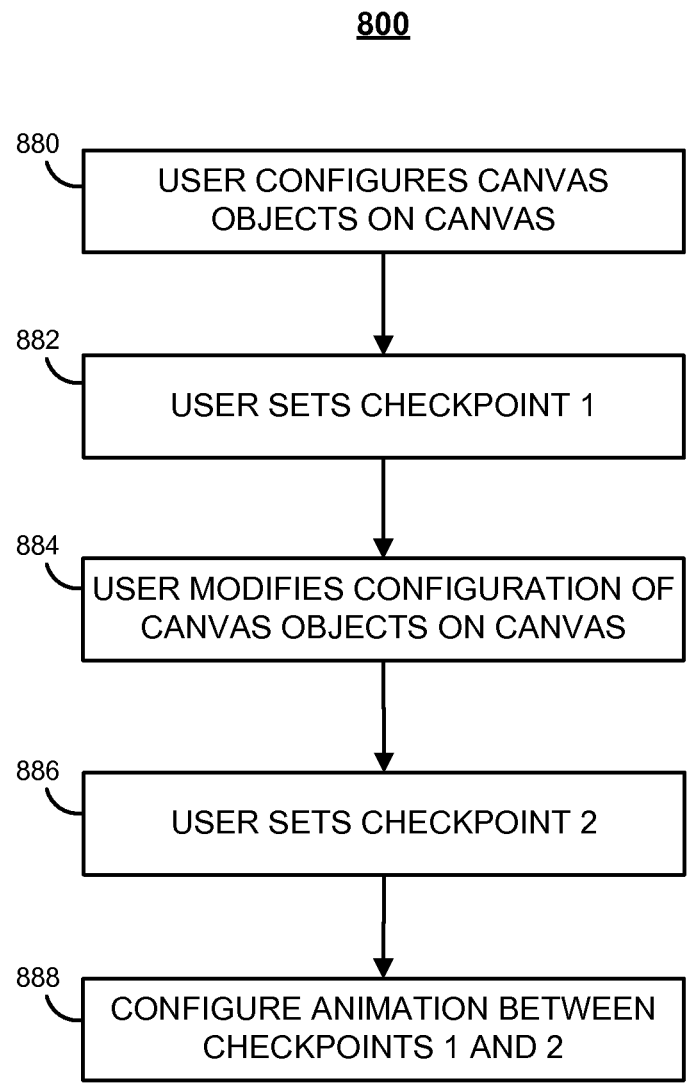
FIG. 8 is a flow chart of a method to configure an animation in a presentation editing interface for time-based presentation editing, according to an illustrative embodiment.

FIG. 8 is a flow chart of a method 800 to configure an animation in a presentation editing interface 108 for time-based presentation editing, according to an illustrative embodiment. Method 800 includes the steps of a user configuring canvas objects on a canvas (step 880), setting a first checkpoint (step 882), modifying the configuration of canvas objects on the canvas (step 884), setting a second checkpoint (step 886), and configuring an animation between the two checkpoints (step 888).

At step 880, the user 104 configures the canvas objects on a digital canvas. Referring now to FIG. 7A, the user first sets the position of time marker 718. Then the user 104 configures the digital canvas by placing canvas objects 720 and 750 in appropriate positions and adjusting other characteristics such as the shape, size, color, and any other characteristic of a canvas object. The user 104 may also create empty state objects 731a and 733a for timeline objects 730 and 732, respectively, and set the widths of these state objects.

At step 882, when the user 104 is satisfied with the configuration of the canvas objects in the digital canvas 714, the user 104 sets a first checkpoint by selecting the button 760. When button 760 is selected, the presentation editing interface 108 saves data associated with the current view of the digital canvas into memory unit 112. In particular, the data is saved into state objects 731a and 733a such that these states now include data indicative of the configuration of their corresponding canvas objects.

At step 884, the user 104 modifies the configuration of the canvas objects on the digital canvas and also creates empty state objects 731b and 733b for timeline objects 730 and 732, respectively. For example, referring now to FIG. 7B, the position of canvas object 720 has changed to the lower right, and canvas object 750 has been rotated clockwise roughly 45 degrees.

At step 886, when the user 104 is satisfied with the modification, the user 104 sets a second checkpoint by selecting the button 760. When button 762 is selected, the presentation editing interface 108 saves data associated with the current view of the digital canvas into memory unit 112. In particular, the data is saved into state objects 731b and 733b such that these states now include data indicative of the configuration of their corresponding canvas objects.

At step 888, an animation is configured between the two views corresponding to the two checkpoints. To configure an animation, the user 104 selects characteristics of the animation, such as a smooth and linear transition between the two views as described in relation to FIG. 5. In addition, any transition effect may also apply, such as the example transition effects described in relation to FIGS. 3A and 3B, such as fading, blinds, box, checkerboard, comb, or any other suitable transition effect for a presentation.

Figure 9:
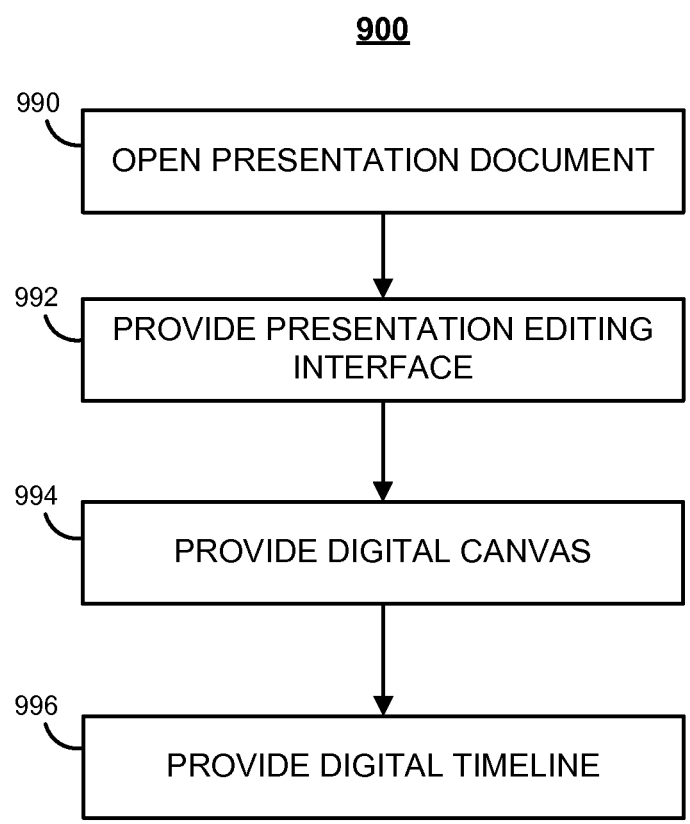
FIG. 9 is a flow chart of a method to provide elements in a presentation editing interface to a user for time-based presentation editing, according to an illustrative embodiment.

FIG. 9 is a flow chart of a method 900 to provide elements in a presentation editing interface 108 to a user for time-based presentation editing, according to an illustrative embodiment. Method 900 includes the steps of opening a presentation document (step 990), providing a presentation editing interface (step 992), providing a digital canvas (step 994), and providing a digital timeline (step 996).

At step 990, the user 104 opens the presentation document 106 on a user device 102. When the presentation document 106 is opened, at step 992, the processor 110 provides a presentation editing interface. In particular, the presentation editing interface 108 or any other suitable presentation editing interface described herein may be provided. Providing the presentation editing interface 108 includes providing a digital canvas at step 994 and a digital timeline at step 996.

At step 994, the processor 110 provides a digital canvas. In particular, the digital canvas 214 or any other digital canvas described herein may be provided. The provided digital canvas includes multiple canvas objects, and each canvas object is in a canvas layer, corresponding to a front-to-back layering of the canvas.

At step 996, the processor 110 provides a digital timeline, such as the digital timeline 216 or any other digital timeline described herein. The digital timeline includes timeline objects, each of which is linked to a canvas object in the digital canvas. The position of each timeline object in the digital timeline corresponds to a time and a layer in which the linked canvas object is displayed on the digital canvas.

The presentation editing interface is provided by displaying a portion of the digital timeline concurrently with displaying a portion of the digital canvas corresponding to a time indicated on the displayed portion of the digital timeline. The presentation editing interface 108 is configured to enable the user 104 to edit the presentation document 106 by modifying a position of a timeline object in the digital timeline and/or a position of a canvas object in the digital canvas.

Figure 10:
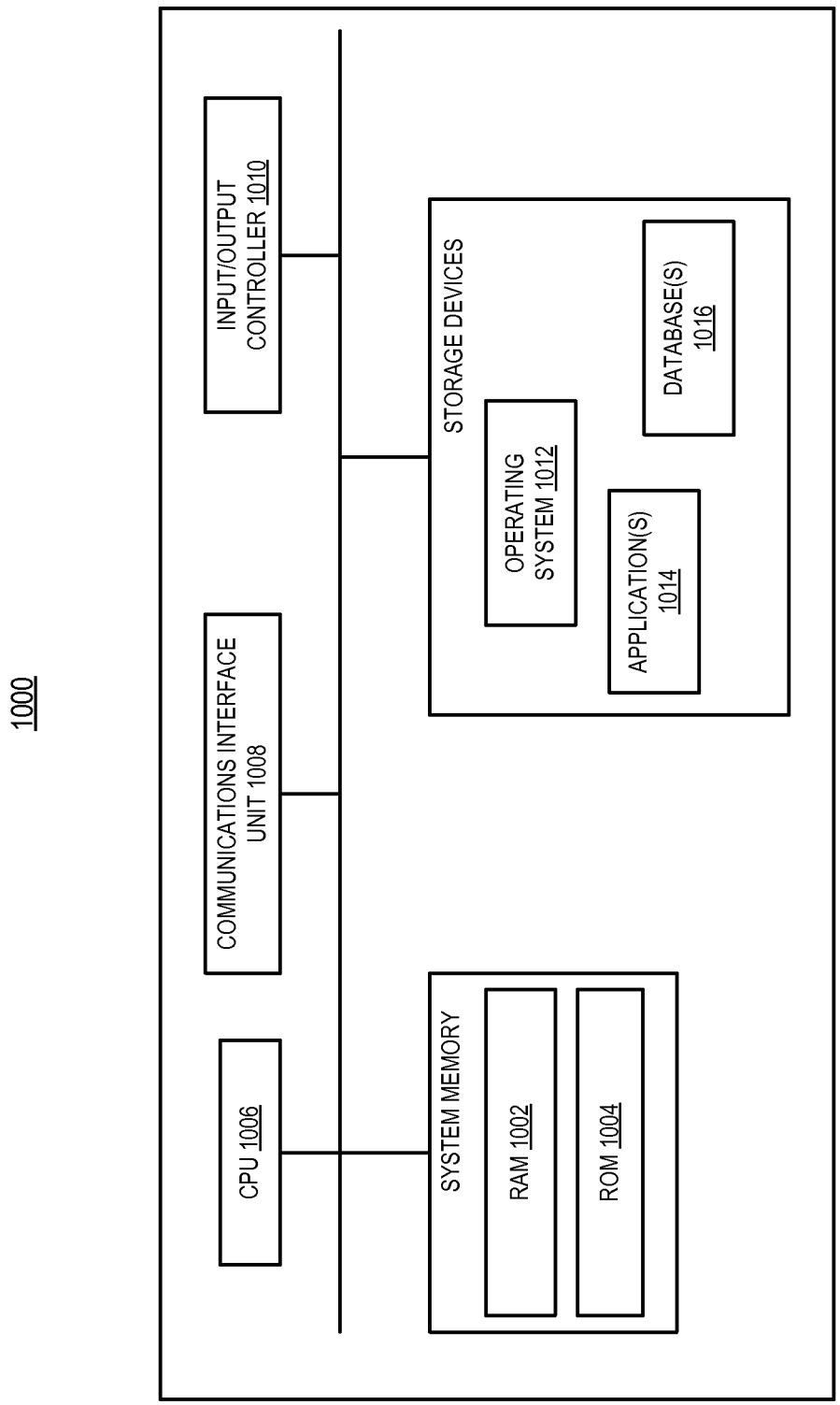
FIG. 10 is a block diagram of a computing device, such as any of the components of the system of FIG. 1, for performing any of the processes described herein.

FIG. 10 is a block diagram of a computing device, such as any of the components of the system of FIG. 1, for performing any of the processes described herein. Each of the components of these systems may be implemented on one or more computing devices 1000. In certain aspects, a plurality of the components of these systems may be included within one computing device 1000. In certain implementations, a component and a storage device may be implemented across several computing devices 1000.

The computing device 1000 comprises at least one communications interface unit, an input/output controller 1010, system memory, and one or more data storage devices. The system memory includes at least one random access memory (RAM 1002) and at least one read-only memory (ROM 1004). All of these elements are in communication with a central processing unit (CPU 1006) to facilitate the operation of the computing device 1000. The computing device 1000 may be configured in many different ways. For example, the computing device 1000 may be a conventional standalone computer or alternatively, the functions of computing device 1000 may be distributed across multiple computer systems and architectures. In FIG. 10, the computing device 1000 is linked, via network or local network, to other servers or systems.

The computing device 1000 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1008 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1006 comprises a processor, such as one or more conventional microprocessors and one or more supplementary co-processors such as math co-processors for offloading workload from the CPU 1006. The CPU 1006 is in communication with the communications interface unit 1008 and the input/output controller 1010, through which the CPU 1006 communicates with other devices such as other servers, user terminals, or devices. The communications interface unit 1008 and the input/output controller 1010 may include multiple communication channels for simultaneous communication with, for example, other processors, servers or client terminals.

The CPU 1006 is also in communication with the data storage device. The data storage device may comprise an appropriate combination of magnetic, optical or semiconductor memory, and may include, for example, RAM 1002, ROM 1004, flash drive, an optical disc such as a compact disc or a hard disk or drive. The CPU 1006 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1006 may be connected to the data storage device via the communications interface unit 1008. The CPU 1006 may be configured to perform one or more particular processing functions.

The data storage device may store, for example, (i) an operating system 1012 for the computing device 1000; (ii) one or more applications 1014 (e.g., computer program code or a computer program product) adapted to direct the CPU 1006 in accordance with the systems and methods described here, and particularly in accordance with the processes described in detail with regard to the CPU 1006; or (iii) database(s) 1016 adapted to store information that may be utilized to store information required by the program.

The operating system 1012 and applications 1014 may be stored, for example, in a compressed, an uncompiled and an encrypted format, and may include computer program code. The instructions of the program may be read into a main memory of the processor from a computer-readable medium other than the data storage device, such as from the ROM 1004 or from the RAM 1002. While execution of sequences of instructions in the program causes the CPU 1006 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to aligning dietary behavior as described herein. The program also may include program elements such as an operating system 1012, a database management system and "device drivers" that allow the processor to interface with computer peripheral devices (e.g., a video display, a keyboard, a computer mouse, etc.) via the input/output controller 1010.

The term "computer-readable medium" as used herein refers to any non-transitory medium that provides or participates in providing instructions to the processor of the computing device 1000 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1006 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A method for editing an electronic presentation, the method comprising:
   providing an electronic presentation editing interface for editing an electronic presentation, wherein the interface comprises:
      a digital canvas comprising a plurality of canvas objects in a plurality of canvas layers;
      a digital timeline comprising a plurality of timeline objects, a time axis, and a graphical indicia on the time axis that represents a pause in the electronic presentation, wherein:
         each canvas object in the plurality of canvas objects is linked to a respective timeline object;
         a position of a timeline object on the digital timeline is indicative of a time and a canvas layer that a linked canvas object is displayed on the digital canvas;
      the position of the timeline object includes a first time coordinate on the time axis indicative of when the linked canvas object appears in the digital canvas, a second time coordinate on the time axis indicative of when the linked canvas object disappears from the digital canvas, and a layer coordinate indicative of a canvas layer in which the linked canvas object appears in the digital canvas;
      the graphical indicia extends over all layer coordinates that are displayed in the digital timeline; and
      the digital timeline further comprises a marker on the digital timeline, wherein a position of the marker is indicative of a time corresponding to a current view of the digital canvas, and wherein when the position of the marker coincides with the graphical indicia on the time axis, each canvas object linked to a timeline object that coincides with the position of the marker is paused.

2. The method of claim 1, further comprising receiving an input from the user over the interface, the input indicative of a request to modify the second time coordinate of the position of the timeline object, wherein the linked canvas object disappears in the digital canvas at a time corresponding to the modified second time coordinate.

3. The method of claim 1, wherein the time on the time axis corresponds to an amount of time since a start of the electronic presentation.

4. The method of claim 1, wherein:
   the digital timeline further comprises a layer axis; and
   the positions of at least two timeline objects in the plurality of timeline objects have different first and second time coordinates along the time axis and a same layer coordinate along the layer axis, such that the two canvas objects linked to the two timeline objects appear in the digital canvas at different times and in the same canvas layer, and wherein the layer axis corresponds to a front to back ordering of the plurality of canvas layers in the digital canvas.

5. The method of claim 4, wherein:
   the layer axis is collapsible such that at least one canvas layer does not have a layer coordinate that appears in the digital timeline, and
   the layer coordinates of the timeline objects that are linked to canvas objects present in a current view of the digital canvas appear in the digital timeline.

6. The method of claim 1, wherein the interface is provided by displaying a portion of the digital timeline concurrently with displaying a portion of the digital canvas corresponding to a time indicated on the timeline.

7. The method of claim 1, wherein the interface is configured to enable a user to modify the layer coordinate of the timeline object in the digital timeline to modify the canvas layer in which the linked canvas object appears in the digital canvas.

8. The method of claim 1, wherein the interface is further configured to enable a user to modify the position of the marker to modify the time corresponding to the current view of the digital canvas.

9. The method of claim 1, wherein a canvas object in the plurality of canvas objects comprises a shape, a portion of text, a figure, a hyperlink, a background, an image, a graphic, a video file, or an audio file.

10. The method of claim 1, wherein a position of the graphical indicia on the time axis is indicative of a time at which the pause occurs in the electronic presentation, such that when the position of the marker reaches the position of the graphical indicia on the time axis, the current view of the digital canvas pauses until a user input is received, wherein the graphical indicia overlays the multiple layer coordinates at a single time coordinate.

11. The method of claim 1, wherein a length of a transition region on the time axis between a first timeline object in the plurality of timeline objects and a second timeline object in the plurality of timeline objects is indicative of a speed of a transition between a first canvas object linked to the first timeline object and a second canvas object linked to the second timeline object, wherein the interface is configured to enable the user to modify the length of the transition region to modify the speed of the transition between the first canvas object and the second canvas object.

12. A system for editing an electronic presentation, comprising:
a processor;
a memory storing computer executable instructions, which when executed by the processor cause the processor to provide an electronic presentation editing interface for editing an electronic presentation, wherein the interface comprises:
   a digital canvas comprising a plurality of canvas objects in a plurality of canvas layers;
   a digital timeline comprising a plurality of timeline objects, a time axis, and a graphical indicia on the time axis that represents a pause in the electronic presentation, wherein:
      each canvas object in the plurality of canvas objects is linked to a respective timeline object;
      a position of a timeline object on the digital timeline is indicative of a time and a canvas layer that a linked canvas object is displayed on the digital canvas;
      the position of the timeline object includes a first time coordinate on the time axis indicative of when the linked canvas object appears in the digital canvas, a second time coordinate on the time axis indicative of when the linked canvas object disappears from the digital canvas, and a layer coordinate indicative of a canvas layer in which the linked canvas object appears in the digital canvas;
the graphical indicia extends over all layer coordinates that are displayed in the digital timeline; and
   the digital timeline further comprises a marker on the digital timeline, wherein a position of the marker is indicative of a time corresponding to a current view of the digital canvas, and wherein when the position of the marker coincides with the graphical indicia on the time axis, each canvas obiect linked to a timeline object that coincides with the position of the marker is paused.

13. The system of claim 12, wherein the interface is configured to receive an input from the user, the input indicative of a request to modify the second time coordinate of the position of the timeline object, wherein the linked canvas object disappears in the digital canvas at a time corresponding to the modified second time coordinate.

14. The system of claim 12, wherein the time on the time axis corresponds to an amount of time since a start of the electronic presentation.

15. The system of claim 12, wherein:
   the digital timeline further comprises a layer axis; and
   the positions of at least two timeline objects in the plurality of timeline objects have different first and second time coordinates along the time axis and a same layer coordinate along the layer axis, such that the two canvas objects linked to the two timeline objects appear in the digital canvas at different times and in the same canvas layer, and wherein the layer axis corresponds to a front to back ordering of the plurality of canvas layers in the digital canvas.

16. The system of claim 15, wherein the layer axis is collapsible such that at least one canvas layer does not have a layer coordinate that appears in the digital timeline, and the layer coordinates of the timeline objects that are linked to canvas objects present in a current view of the digital canvas appear in the digital timeline.

17. The system of claim 12, wherein the processor provides the interface by displaying a portion of the digital timeline concurrently with displaying a portion of the digital canvas corresponding to a time indicated on the timeline.

18. The system of claim 12, wherein the interface is configured to enable a user to modify the layer coordinate of the timeline object in the digital timeline to modify the canvas layer in which the linked canvas object appears in the digital canvas.

19. The system of claim 12, wherein the interface is further configured to enable a user to modify the position of the marker to modify the time corresponding to the current view of the digital canvas.

20. The system of claim 12, wherein a canvas object in the plurality of canvas objects comprises a shape, a portion of text, a figure, a hyperlink, a background, an image, a graphic, a video file, or an audio file.

21. A non-transitory computer readable medium storing computer executable instructions, which, when executed by a processor, cause the processor to carry out a method for editing an electronic presentation, comprising:
providing an electronic presentation editing interface for editing an electronic presentation, wherein the interface comprises:
   a digital canvas comprising a plurality of canvas objects in a plurality of canvas layers;
   a digital timeline comprising a plurality of timeline objects, a time axis, and a graphical indicia on the time axis that represents a pause in the electronic presentation, wherein:
      each canvas object in the plurality of canvas objects is linked to a respective timeline object;
      a position of a timeline object on the digital timeline is indicative of a time and a canvas layer that a linked canvas object is displayed on the digital canvas;
      the position of the timeline object includes a first time coordinate on the time axis indicative of when the linked canvas object appears in the digital canvas, a second time coordinate on the time axis indicative of when the linked canvas object disappears from the digital canvas, and a layer coordinate indicative of a canvas layer in which the linked canvas object appears in the digital canvas;
the graphical indicia extends over all layer coordinates that are displayed in the digital timeline; and
   the digital timeline further comprises a marker on the digital timeline, wherein a position of the marker is indicative of a time corresponding to a current view of the digital canvas, and wherein when the position of the marker coincides with the graphical indicia on the time axis, each canvas object linked to a timeline object that coincides with the position of the marker is paused.

22. The non-transitory computer readable medium of claim 21, wherein the interface is configured to receive an input from the user, the input indicative of a request to modify the second time coordinate of the position of the timeline object, wherein the linked canvas object disappears in the digital canvas at a time corresponding to the modified second coordinate.

23. The non-transitory computer readable medium of claim 21, wherein the time on the time axis corresponds to an amount of time since a start of the electronic presentation.

24. The non-transitory computer readable medium of claim 21, wherein:

the digital timeline further comprises a layer axis; and the positions of at least two timeline objects in the plurality of timeline objects have different first and second time coordinates along the time axis and a same layer coordinate along the layer axis, such that the two canvas objects linked to the two timeline objects appear in the digital canvas at different times and in the same canvas layer, and wherein the layer axis corresponds to a front to back ordering of the plurality of canvas layers in the digital canvas.

25. The non-transitory computer readable medium of claim 24, wherein the layer axis is collapsible such that at least one canvas layer does not have a layer coordinate that appears in the digital timeline, and the layer coordinates of the timeline objects that are linked to canvas objects present in a current view of the digital canvas appear in the digital timeline.

26. The non-transitory computer readable medium of claim 21, wherein the interface is provided by displaying a portion of the digital timeline concurrently with displaying a portion of the digital canvas corresponding to a time indicated on the timeline.

27. The non-transitory computer readable medium of claim 21, wherein the interface is configured to enable a user to modify the layer coordinate of the timeline object in the digital timeline to modify the canvas layer in which the linked canvas object appears in the digital canvas.

28. The non-transitory computer readable medium of claim 21, wherein the interface is further configured to enable a user to modify the position of the marker to modify the time corresponding to the current view of the digital canvas.

29. The non-transitory computer readable medium of claim 21, wherein a canvas object in the plurality of canvas objects comprises a shape, a portion of text, a figure, a hyperlink, a background, an image, a graphic, a video file, or an audio file.

* * * * *